United States Patent
Pugh (10) Patent No.: US 9,251,850 B2
(45) Date of Patent: Feb. 2, 2016

(54) NONLINEAR PROXY-BASED EDITING SYSTEM AND METHOD HAVING IMPROVED AUDIO LEVEL CONTROLS

(71) Applicant: BITCENTRAL INC., Newport Beach, CA (US)

(72) Inventor: Daniel Pugh, Newport Beach, CA (US)

(73) Assignee: BITCENTRAL INC., Newport Beach, CA (US)

( * ) Notice: Subject to any disclaimer, the term of this patent is extended or adjusted under 35 U.S.C. 154(b) by 357 days.

(21) Appl. No.: 13/720,012

(22) Filed: Dec. 19, 2012

(65) Prior Publication Data

US 2014/0173437 A1    Jun. 19, 2014

(51) Int. Cl.
G11B 27/034    (2006.01)
G11B 27/28     (2006.01)
G11B 27/34     (2006.01)

(52) U.S. Cl.
CPC .............. *G11B 27/034* (2013.01); *G11B 27/28* (2013.01); *G11B 27/34* (2013.01)

(58) Field of Classification Search
CPC ....... G11B 27/02–27/06; H04N 21/23–21/242
USPC .................................. 715/724, 731; 386/285
See application file for complete search history.

(56) References Cited

U.S. PATENT DOCUMENTS

| | | | | |
|---|---|---|---|---|
| 7,626,111 B2* | 12/2009 | Kim | .......................... | G10H 1/00 700/94 |
| 8,265,300 B2* | 9/2012 | Reid | .................... | G06F 3/04847 345/440 |
| 2001/0004417 A1* | 6/2001 | Narutoshi | ............ | G11B 27/031 386/283 |
| 2001/0036356 A1* | 11/2001 | Weaver | ................ | G11B 27/034 386/282 |
| 2005/0025454 A1* | 2/2005 | Nakamura | ........... | G11B 27/031 386/280 |
| 2005/0180580 A1* | 8/2005 | Murabayashi | ....... | G11B 27/034 381/81 |
| 2005/0282504 A1* | 12/2005 | Yeh | .............................. | 455/90.1 |
| 2007/0071406 A1* | 3/2007 | Koga et al. | ........................ | 386/95 |
| 2009/0195255 A1* | 8/2009 | Kalokitis et al. | ............... | 324/522 |
| 2010/0088733 A1* | 4/2010 | Chan et al. | ........................ | 725/80 |
| 2010/0262913 A1* | 10/2010 | Takagi | ........................... | 715/723 |
| 2011/0211812 A1* | 9/2011 | Tzoukermann et al. | ....... | 386/250 |
| 2013/0061143 A1* | 3/2013 | Eppolito | ............. | G06F 3/04847 715/716 |
| 2013/0159852 A1* | 6/2013 | Classen et al. | ................ | 715/716 |
| 2014/0115470 A1* | 4/2014 | Meaney | ................. | H04N 9/806 715/719 |

OTHER PUBLICATIONS

"FORscene Webpage." Archive.org. Nov. 25, 2011. Web. <http://web.archive.org/web/20111125111250/http://www.formidabletechnologies.com/>.*

(Continued)

*Primary Examiner* — Jennifer To
*Assistant Examiner* — Liang Li
(74) *Attorney, Agent, or Firm* — Roberts Mlotkowski Safran & Cole P.C.

(57) ABSTRACT

A proxy-based, nonlinear editing system and method with improved audio level controls is provided. The system includes a proxy file generator, an audio summary file generator that assigns a single audio level for each proxy file video frame, a web user interface having a visual display, and a digital controller. Whenever a proxy file selected for display on the visual display, the digital processor simultaneously provides a graph of the associated audio summary file. The digital processor serially connects, on the same axes, the audio graphs of proxy files being assembled into an edited product, marks the location of audio "spikes", and provides the web user interface with controls for adjusting the audio level of all or a portion of the audio graphs.

10 Claims, 11 Drawing Sheets

(56) References Cited

OTHER PUBLICATIONS

Mercer, Colin. "Cleaning Up Data." Sep. 22, 2003. Web. <http://www.prosig.com/signal-processing/CleaningUpData.pdf>.*

European Broadcasting Union. "BWF Supplement 3—Peak Envelope Chunk." Jul. 2001. <https://tech.ebu.ch/docs/tech/tech3285s3.pdf>.*

Apple. "Final Cut 7 User Manual." 2010. <http://documentation.apple.com/en/finalcutpro/usermanual/Final%20Cut%20Pro%207%20User%20Manual%20%28en%29.pdf>.*

"FORscene Tutorial." Archive.org. Oct. 4, 2011. Web. <http://web.archive.org/web/20111004101953/http://pro.forscene.net/tutorial-create/published/Upload76-1177076170.can/>.*

ZeeBigBang. "FORscene Edit Suite Overview—Basic Assembly" [Video File]. Oct. 15, 2010. <https://vimeo.com/15886911>.*

Apple. "Final Cut 7 User Manual". 2010. <http://documentation.apple.com/en/finalcutpro/usermanual/Final%20Cut%20Pro%207%20User%20Manual%20%28en%29.pdf>.*

ZeeBigBang ("FORscene Edit Suite Overview—Basic Assembly", published Oct. 15, 2010) <https://vimeo.com/15886911>.*

\* cited by examiner

NONLINEAR PROXY-BASED EDITING SYSTEM AND METHOD HAVING IMPROVED AUDIO LEVEL CONTROLS

FIELD

This invention generally relates to nonlinear editing systems for audio-visual media files, and is particularly concerned with a proxy-based, nonlinear editing system and method with improved audio level controls for improving work efficiency.

BACKGROUND

Nonlinear editing (NLE) systems are well known in the prior art, and are used in the news rooms of television broadcasting stations to assemble video clips for news stories from a variety of different electronic media files. As the name implies, NLE systems enable direct access to any frame in a digital video clip without the need to play or shuttle through adjacent footage to reach it, as was necessary with older videotape editing systems. In operation, all of the raw or source media files associated with a particular news story are imported into a source media repository. This is typically accomplished by connecting the removable memory media of a file-based digital video camera to the memory card reader of a computer. The removable memory media may take the form of solid state electronic memory devices, hard disks, or removable disks, but will hereafter be referred to as memory cards. A user inserts the memory card from the camera into the card reader of a computer and copies the file contents of the memory card into shared local or network file storage which will hereafter be referred to as a repository. The editor reviews the source media files associated with the particular news story on the viewing screen of an editing terminal and performs editing actions which cause the system to generate an Edit Decision List (EDL) which specifies which parts of which clips are connected and in what order. The final clip is created by selective electronic copying and pasting together portions of the source media files stored in the repository. This process may also include the application of various digital effects such as filters, dissolves, fades, or image overlays.

NLE systems obviate the need for the time-consuming act of mechanically cutting and splicing together the originals of the video tape or film negatives. Moreover, because the EDL is executed only by reading the source media files and not writing to them, no portion of the source media files stored in the repository is destroyed or changed as a result of the editing operation. Hence the source media files stored in the repository may be re-edited into as many different versions as desired.

Proxy-based NLE systems are also known in the prior art. Such systems were developed upon the realization that it is not necessary for the editor to view the original high definition, high-bandwidth media file in generating the EDL. Instead, a low-resolution proxy file may be used for such purposes. In operation, the low-resolution proxy file is generated and stored soon after the raw, high-resolution media file is exported into the source media repository of the system. Whereas non-proxy based NLE systems require powerful workstations to perform editing operations on full-size source video files, proxy-based systems can run on relatively inexpensive computers because of the comparatively small size of the proxy files. In proxy-based systems, the computationally intensive work of producing the proxies and the final output is usually done centrally on powerful shared servers. The ability of such proxy media files to be easily and quickly downloaded, uploaded and viewed over local networks or the broader Internet conveniently allows an editor to efficiently generate an EDL from any web-connected location via a laptop or desk top computer.

SUMMARY

Despite the many advantages associated with proxy-based NLE systems, the applicant has observed a number of shortcomings in the volume controls of such prior art systems that make it difficult and time consuming for the editor to provide a balanced and uniform sound track for the final edited product. Different video clips have perceptibly different average audio levels as a result of the environment that the video recording was made in (e.g. a noisy factory vs. a sound-controlled studio), the subject matter of the video clip (e.g. studio interview vs. fire trucks rushing to a burning building) as well as the distance, placement, and sensitivity of the microphones used to record the sounds. Accordingly, when stringing together various video clips into a final product, the editor often must include a number of audio level adjustment decisions in the EDL in order to avoid abrupt differences in the audio levels at transition points between the clips, and to maintain a substantially uniform audio level throughout the finished product.

Additionally, the audio track may include spurious "sound spikes" that must be either substantially reduced or eliminated in order produce a high quality final product. Such sound spikes may arise, for example, from an inadvertent bumping or knocking over of a microphone, or the dropping of a book or other object during a studio interview. In many prior art proxy-based NLE systems, such spurious sound spikes can only be detected by scrolling through the individual video clips and adjusting or eliminating them on an ad hoc basis. One possible solution to this problem might be the generation of a sound graph for each video clip that displays audio amplitude over time. The editor could then quickly scroll through the video frames on either side of the sound spike to determine if the spikes were legitimate (such as gun shots in a war documentary) or spurious (such as a bumped microphone) and make appropriate volume adjustments. However, the density of the audio data present even on proxy files (typically 705,600 bits/second) makes it difficult to perceive problematical sound spikes along the time line of such a graph. Since any graphical display of audio levels would have to encompass at least several minutes of sound track at one time to be useful, any such graphical display would include millions of sample points. While the problem might be solved by generating an audio summary that greatly decreases the density of the sample points, the manner in which such a summary file is generated would be critical to the overall success of such an approach. For example, if the summary file were generated by a simple averaging the sample audio levels for each video frame, such averaging may "mask" a sound spike that lasts only a few milliseconds in a frame having mostly low sound levels so that the spike does not show up in the resulting audio graph. And even reducing the number of sample points down to one sample point per video frame would still result in a high data density along the time line of an audio graph as video frames are played at a speed of 30 frames per second.

Further compounding these difficulties is the fact that the most preferred commercially-available software for video playback on web browsers does not allow software executing in the browser to have direct access to the audio stream being played. So while the generation of a time/amplitude graph of the audio file might be a good starting point in making audio editing decisions, it is impractical if not impossible for application code executing on the browser to directly generate a time/amplitude audio graph of the sound track associated with a video source file in many of the presently available proxy-based non-linear editing systems running in web browsers.

Accordingly, there is a need for improved audio controls in a proxy-based editing system that allows an editor to easily correct abrupt differences in the audio levels at transition points between video clips. Such audio controls should further allow the editor to quickly and easily reduce or eliminate spurious sound spikes without the need for scrolling completely through the series of video clips, and to otherwise provide a balanced and uniform audio level throughout the final edited product with a minimum amount of time and effort.

To these ends, the non-linear editing system of the invention comprises a proxy file generator that generates a low resolution proxy file of source video files containing both video and audio information; an audio summary file generator that generates an audio summary file from the audio information in the proxy file that provides a single audio level for each video frame of the proxy file, and a web user interface having a visual display for displaying a selected one of the proxy files generated by the proxy file generator and its associated audio summary file. The system further includes a digital controller connected to the proxy file generator, the audio summary file generator, and the web user interface that automatically provides a graphic display of the audio summary file associated with the proxy file selected for display on the visual display. Preferably the graphic display includes a time axis in units of video frames, and an amplitude axis in units of audio level.

The audio summary file generator preferably determines the single audio level per video frame by selecting the highest audio level within the frame that lasts at least long enough to be perceived by human hearing. Accordingly, the summary file generator selects the highest audio level that lasts at least 3 milliseconds, and more preferable at least 5 milliseconds. Such a sampling process prevents the masking of sound spikes which the editor may wish to attenuate or eliminate which might otherwise occur if this single value were chosen on the basis of an arithmetic mean or median of all of the sample points within the frame. Additionally, as the perception of audio levels as sensed by human hearing is logarithmic, the audio graph expresses the value of the highest audio level per frame in logarithmic units so that the audio levels indicated along the vertical axis of the graph reflect the relative sound volumes perceived by a human listener.

The digital controller of the system further preferably provides a visual indication on the graphic display of the location of every video frame or group of frames having an associated audio level that is higher than a preselected maximum audio level. Such a visual indication may take the form of arrows or brackets located directly above the spike or group of spikes which allows the editor to immediately identify the location of potentially spurious loud noises in every video clip. The digital controller may further provide a control function, such as a zoom-in capability on the graphic display that allows a user to selectively play only those portions of the video clip surrounding the spike-containing frames and to make appropriate volume adjustments.

Finally, the digital controller allows the audio graphs of several serially connected video clips to be displayed simultaneously and further provides control functions that allows all or only a selected portion of the audio graph of a particular video clip to be raised or lowered to quickly eliminate abrupt differences in the audio levels at transition points between the clips, and to provide a substantially uniform audio level throughout the finished product.

BRIEF DESCRIPTION OF THE DRAWINGS

FIG. 1 is a schematic diagram of an example of the NLE system that the inventive audio level controls are applied to;

DETAILED DESCRIPTION OF THE EMBODIMENTS

Figure 1:
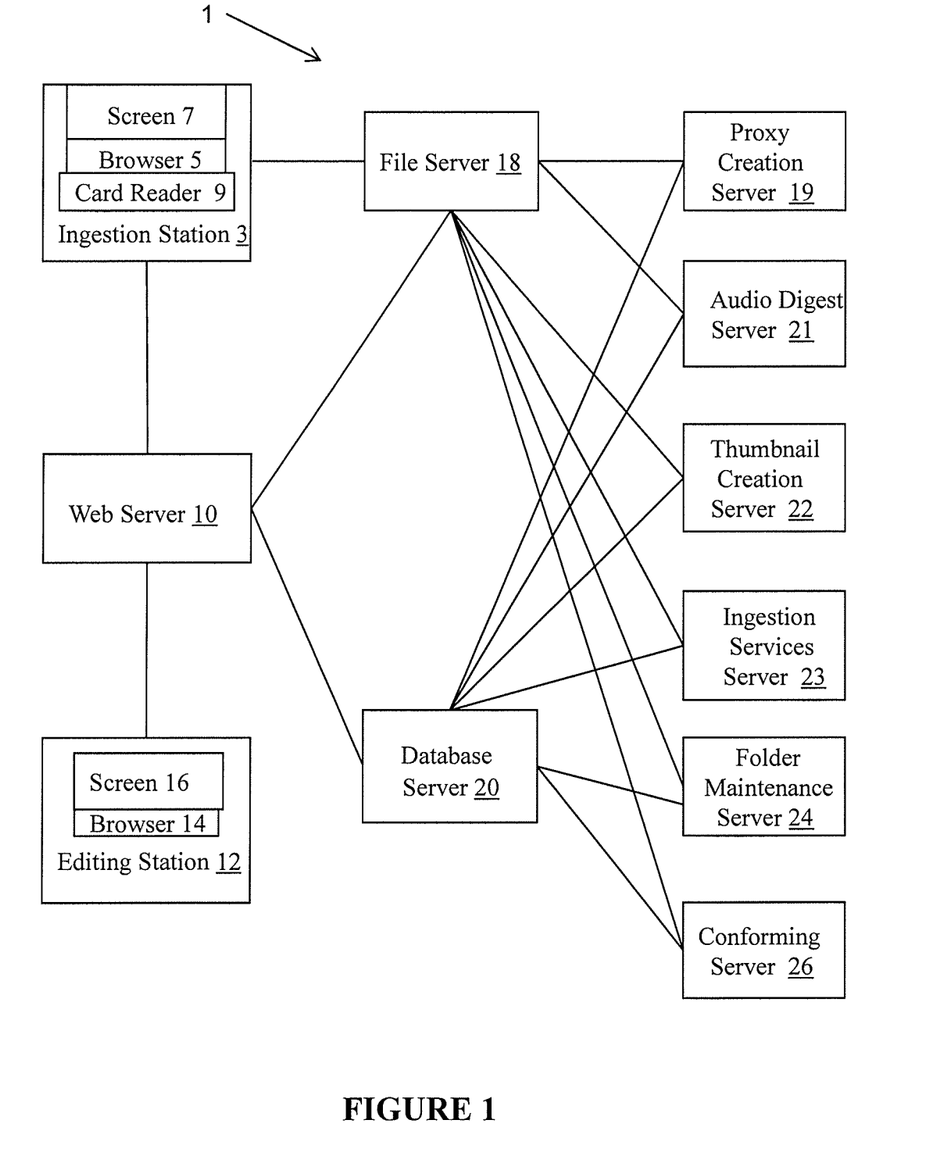

With reference now to FIG. 1, the NLE system 1 of the invention includes an ingestion station 3 having a web browser 5, a display screen 7, and a card reader 9 capable of reading media files recorded onto memory cards. The ingestion station 3 further preferably includes a card monitor (not shown) which senses when a memory card is inserted into the card reader 9. The ingestion station 3 is connected to a web server 10 via a computer communication network. The NLE system 1 further includes an editing station 12 having a web browser 14 and display screen 16 that is likewise connected to the web server 10 as shown. The web server 10 is capable of generating web pages dynamically in response to requests from the browser 5 and browser 14. Such requests will typically require the web server 10 to collect information from other servers in the system 1, and to combine and prepare that data into web pages and data streams that may be used by the browser 5 and browser 14. While the drawing shows only one ingestion station 3 and one editing station 12, it should be noted that an NLE system 1 having a multiplicity of ingestion stations 3 and editing stations 12 is within the scope of this invention. Also, while the ingestion station 3 and the editing station 12 are indicated as separate physical devices, it should be noted that the browser 5 of the ingestion station 3 is capable of presenting the editing web pages and thus may perform all the functions of the editing station 12.

The system 1 further includes a file server 18 which satisfies requests to store or retrieve files or to provide metadata about files. It is connected via a computer communication network to the ingestion station 3 and web server 10. A proxy creation server 19 is connected to the file server 18 as shown. This server 19 creates a low-definition, low-bandwidth proxy files of media source files imported into the file server 18, and relays the proxy files back to the file server 18 for storage. The proxy creation server 19 is further connected to a database server 20, from which it retrieves "proxy job" instructions that includes the identity of the source file within the file server 18 that the proxy server 19 is to generate a proxy file of and to which it records information about the result of the proxy creation process. Because the system 1 is in fact a distributed system with all the indicated servers having internet access, the proxy creation server 19 may outsource the large amount of computations necessary to generate a proxy file from a source file to cloud computing. The proxy files generated by the proxy creation server 19 are relayed to and stored in the file server 18.

An audio digest server 21 is also connected to the file server 18 and the database server 20 as shown. The audio digest server 21 receives instructions from the database server 20 to select a particular video file stored file server 18 and to generate an audio digest of the sound data in the selected video file. In the preferred embodiment, the audio level server 21 is programmed to assign a single sound level for each frame in the proxy file. A common digital encoding of audio in audio-visual source files uses 44.1K samples per second with each sample being an integer from −32K to +32K, requiring 16 bits for each sample. Accordingly, 705,600 bits of sound information are present in each second of a video source file. By summarizing the samples down to a single number for each frame of video (which is usually played at the rate of 30 frames per second), the sound data is reduced from 705,600 bits/second to 30×16=480 bits/second. The calculation of this representative summary value can be made by applying one of a number of algorithms as applicable for different situations. Since the use of an averaging algorithm could mask the presence of a sound spike in a frame, a useful summarizing algorithm might be the selection of the loudest sample point or points within the frame. However, the applicant has observed that the resulting selection could result in a "false positive" as it is necessary for a sound to have a certain minimum duration before is perceived by human hearing. Accordingly, the preferred sound digest algorithm used by the audio digest server 21 of the invention is the maximum sound amplitude within the frame having a sufficiently long duration to be perceived by human hearing, e.g. at least about 3 milliseconds and more preferably about 5 milliseconds. This particular algorithm will be used for the remaining discussion and examples.

Since each frame in the video file contains about 2,133 bytes of sound information, a substantial amount of computational bandwidth is required to reduce the sound information from 2,133 bytes to a single byte for each frame, regardless of what particular algorithm is used to generate the single byte per frame. Accordingly, like the proxy creation server 19, the audio digest server 21 may outsource the computations necessary to generate an audio summary file to cloud computing. The audio summary file generated by the audio digest server 21 are relayed to and stored in the file server 18.

A thumbnail creation server 22 is also connected to both the file server 18 and the database server 20. This server 22 creates a thumbnail image or icon for each of the video clips associated with a particular story. The thumbnail images associated with all of the video clips held within a particular story folder are shown on the display 16 of the editing station 12 when all of the proxy files, audio summary files and thumbnails have been generated and stored in the file server 18. These thumbnail images help the editor identify the subject matter of a particular video source file that a proxy file has been generated for. The thumbnail typically includes a still image made from one of the beginning frames of the source file. Like the proxy creation server 19, the thumbnail creation server 22 retrieves "thumbnail job" instructions from the database server 20 that include the identity of the source file within the file server 18 that the server 22 is to generate a thumbnail or icon of.

Further included within the NLE system 1 are both an ingestion services server 23 and a folder maintenance server 24. Both of these servers 23 and 24 are connected to the file server 18 and the database server 20. The ingestion services server 23 includes software that instructs it to (1) continuously monitor new source files copied into the file server 18, (2) make a record in the database server 20 of the name and location of each new source file found, (3) create a "proxy job" for each media file in the memory card, and store the "proxy job" in the file server 18, (4) create an "audio summary job" for each media file in the memory card, and store the "audio summary job" in the file server 18, (5) create an "thumbnail job" for each media file in the memory card and store the "thumbnail job" for each media file in the file server 18, (6) make a "media set" record in the database server 20 that contains references to the source file, and its associated proxy file, audio summary file and thumbnail file such that the locations of the files on the file server 18 can later be resolved, and (7) automatically relay the completed proxy files, audio summary files, and thumbnail from the file server 18 to the editing station 12 via the web server 10. The folder maintenance server 24 includes software to maintain the basic structure of the folders on the disc of the file server 18 to match the folder identifiers and locations stored in the database server 20.

Finally, the NLE system 1 of the invention includes a conforming server 26. The conforming server 26 receives the Edit Decision List (EDL) generated by the user at the editing station 12 which specifies which parts of which clips within the source files are connected and in what order, as well as any adjustments to the volume of the assembled clips. It may further specify what if any special audio or video transformations or effects are to be applied to create the desired output. Conforming server 26 then implements the EDL by selectively copying portions of the source files within the file server 18 and stringing these copied portions together and making volume adjustments in accordance with the instructions in the EDL. The edited story version is again stored in the file server under a unique name and location. Advantageously, the original source files stored in the file server 18 remain entirely intact no matter how many edited versions are generated from them.

Figure 2A:
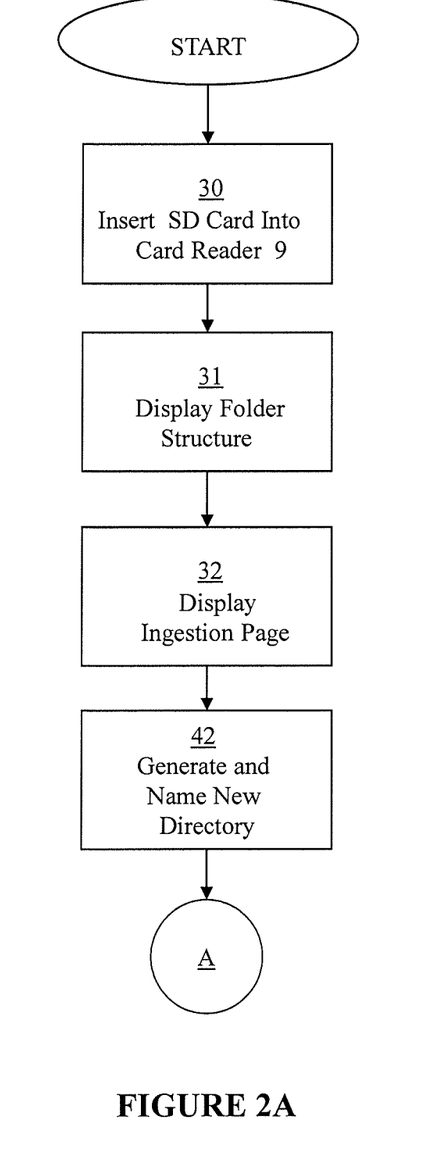
FIGS. 2A-2C are a flowchart illustrating the process implemented by the NLE system in generating and displaying an audio summary file in association with proxy files being displayed in a browser-based editing station.
Figure 2B:
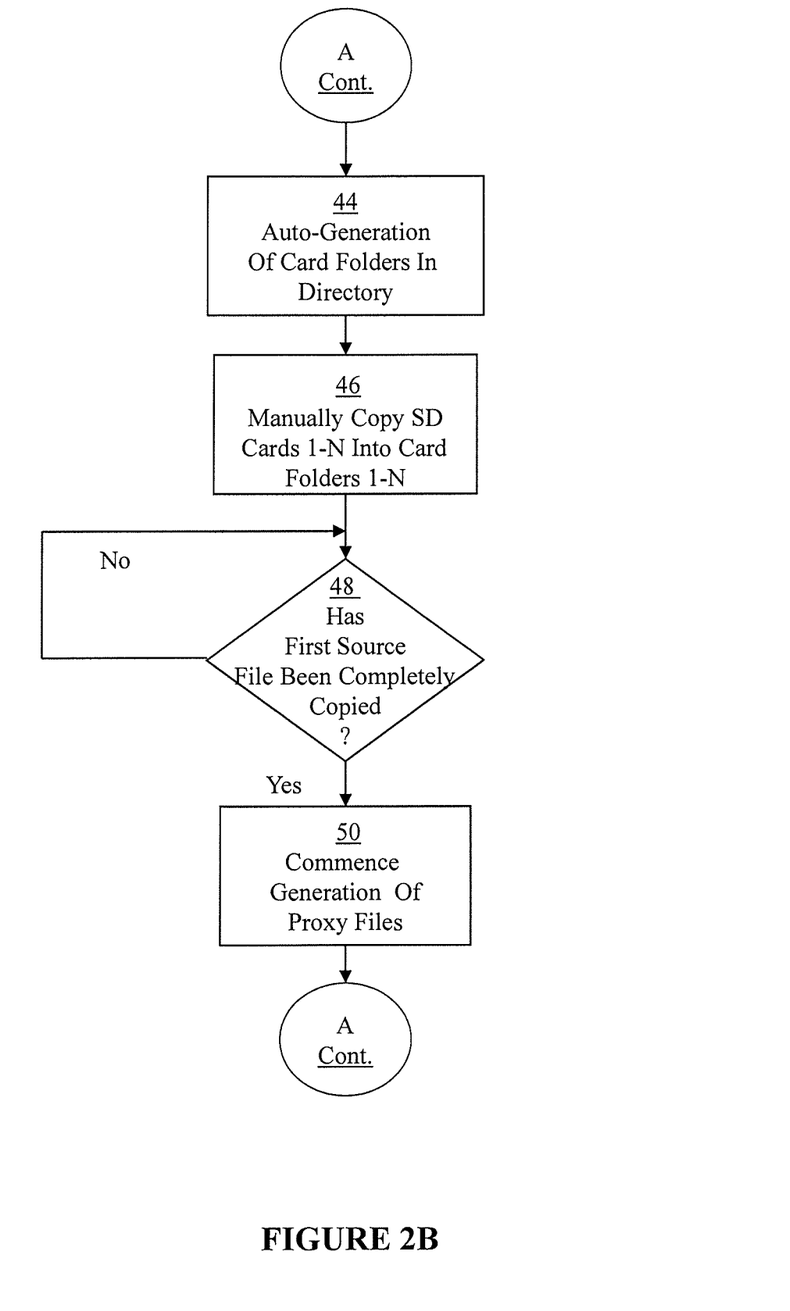
Figure 2C:
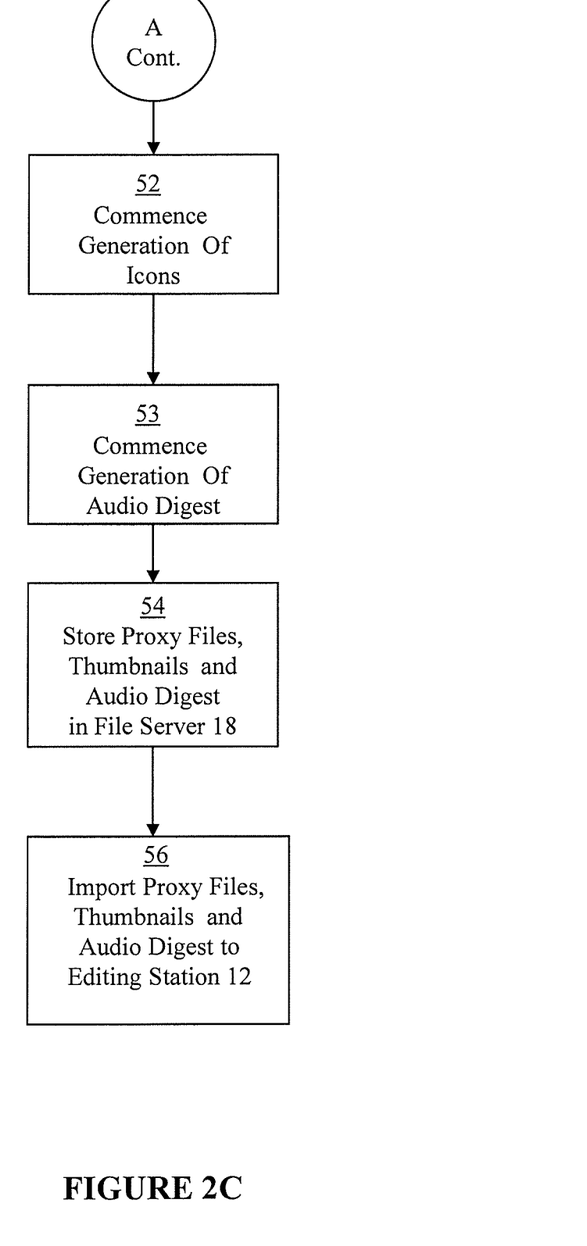

The operation of the system 1 will now be described with respect to FIGS. 2A-2C. In this mode of operation, the user first inserts an SD card into the card reader 9 of the ingestion station 3. The ingestion station 3 then displays the folder structure of the files contained within the SD card on the screen 7 as indicated in block 31. Simultaneously, the screen 7 also displays an ingestion page from the Create® URL that is relayed to the station 3 from the web server 10, as is indicated in block 32. The display of the ingestion page prompts the user to generate and name a new directory to transfer the folders of the SD card into, as is indicated in block 42. To facilitate the transfer of the files from the SD card into the directory generated by the user in block 42, the system automatically generates a plurality of differently-named folders as is indicated in block 44. The user then manually copies the files recorded on the SD card into the card folders of the directory, as is indicated in block 46. Such a manual transfer of the files may be done via a "click and drag" operation from the mouse of the web browser 5 of the ingestion station 3.

In the meantime, as is indicated in question block 48, the ingestion services server 23 is constantly inquiring whether or not the first source file of the SD card has been completely copied into the auto-generated files created in block 44. If the answer is "no" then the proxy creation server 19 takes no action. But if the answer to the inquiry is "yes" then the ingestion services server 23 instructs the proxy creation server 19 to commence the generation of a proxy file of the source file that has been completely copied into a folder in the directory as indicated in block 50. The proxy creation server 19 relays the proxy file of the source file to the file server 18. At the same time the ingestion services server 23 instructs (1) the thumbnail creation server 22 to commence the generation of a thumbnail representative of the video portion of the source file (which is usually a low resolution copy of one of the beginning frames of the video file) as indicated in block 52, and (2) the audio digest server 21 to generate an audio file representative of the sound track of the source file as indicated in block 53. The process for generating the audio summary file will be discussed more in detail hereinafter with respect to FIGS. 4A-4F. The thumbnails and audio digests are then stored in the file server 18 and with the proxy file, as shown in step 54. Finally, the proxy files, thumbnails and audio digests are imported to the editing station 12 as indicated in block 56. The manner in which these files are displayed is illustrated by the screen shot of FIG. 7, which will also be discussed in greater detail hereinafter.

Figure 3:
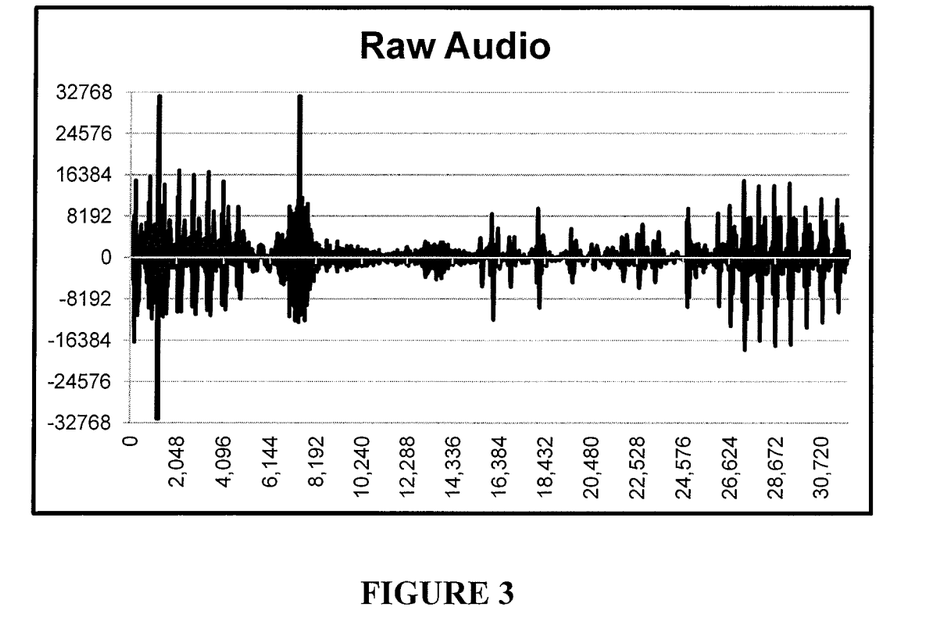
FIG. 3 is a graph of the raw audio sample points present in the sound track of the source file.

FIGS. 3 and 4A-4E illustrate the manner in which the audio digest server generates the summary audio file that is representative of the sound track of the source file. FIG. 3 is a graph of the raw audio sample points present in the sound track of the source file, with the vertical or y axis representing amplitude in units of fluid pressure on an absolute scale ranging from −32K to +32K, and the horizontal or x axis representing time in terms of sample points that are taken at a frequency of 44,100 samples per second. Accordingly, the 32K samples shown along the x axis of the graph represent about three quarters of a second. The sound values vertically oscillate between positive and negative values since sound is a pressure wave that oscillates between positive and negative pressure. The density of sample points is approximately 705,600 bits/second. Note the sound spikes occurring at about 1200 and 7400.

Figure 4A:
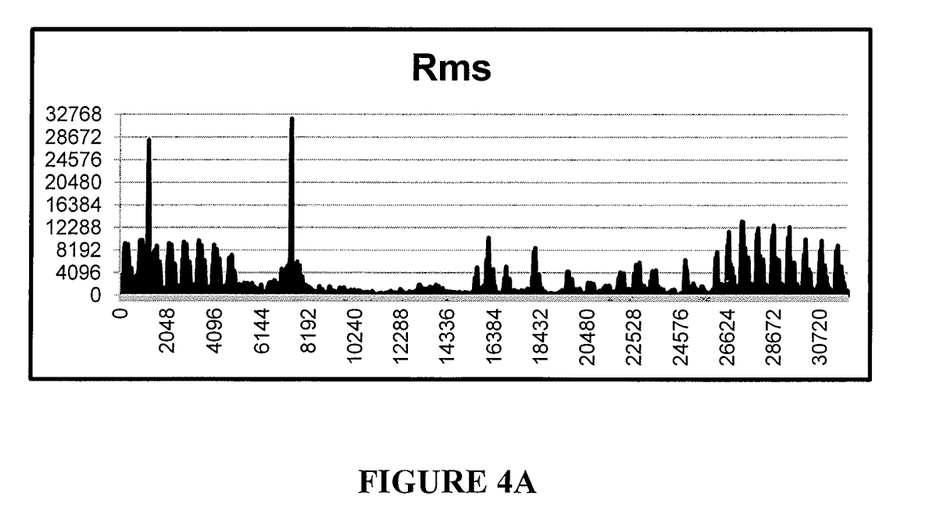
FIGS. 4A-4D illustrate how the audio digest server of the NLE system processes the raw audio sample points associated with a source file into an audio summary file that may be displayed simultaneously with a video clip at the editing station of the NLE system.

The first step in creating an audio summary file of the audio source file is to apply a root mean square transformation of the raw audio data illustrated in FIG. 3. FIG. 4A is a graph of the resulting audio file. The application of such a root mean square transformation with a 50 millisecond window transforms all of the audio levels shown in the graph of FIG. 3 into positive pressure values, thereby smoothing the graph and halving the vertical scale of the graph. However, since the video files are played at thirty frames per second, each frame contains 1,470 sample points, which is much too dense to be usable for editing purposes. Accordingly, a way to reduce the sound data to single sample per frame must be found that does not "mask" the relatively short duration sound spikes occurring at sample numbers 1200 and 7400.

Figure 4B:
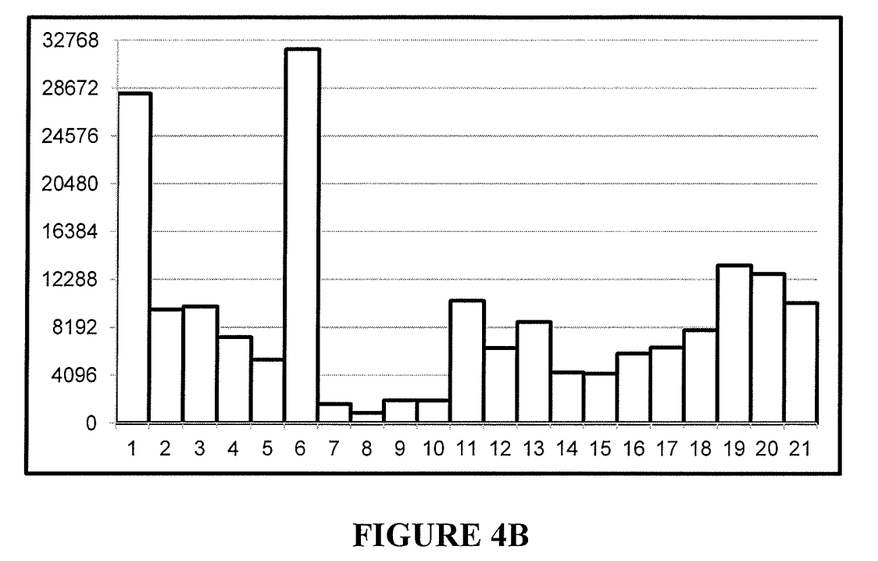

In the preferred audio digest algorithm of the invention, a single audio value is assigned to each video frame on the basis of the maximum sound amplitude within the frame having a sufficiently long duration to be perceived by human hearing, e.g. at least about 3 milliseconds and more preferably about 5 milliseconds. When such an algorithm is applied to the 1,470 sample points for each frame, the result is illustrated in the graph of FIG. 4B. Note how the sound spikes occurring at sample numbers 1200 and 7400 (and contained within video frames 1 and 6 respectively) determine the heights of the resulting column graphs for video frames 1 and 6, thus making these points in the audio graph easier to visually perceive. The use of such an algorithm effectively avoids the "masking" of short duration loud sounds that might otherwise occur if a simple averaging-type algorithm were applied. In the present example, each of the sound spikes occurring at sample numbers 1200 and 7400 is about 250 samples wide, while the sound levels on either side of these spikes is substantially lower. Since samples are being taken at the rate of 44,100 per second, each sound spike is about 5 milliseconds in duration. By contrast, at 30 frames per second the sound track for each frame lasts about 33 milliseconds. Accordingly, the excessively loud noise in frames 1 and 6 accounts for only about 5/33=15% of the total sample points in the frame. If the other 85% of the audio sample points are moderate to low, it is easy to see how the averaging all of the audio sample points of a single audio frame would effectively mask the presence of the sound spike.

Figure 4C:
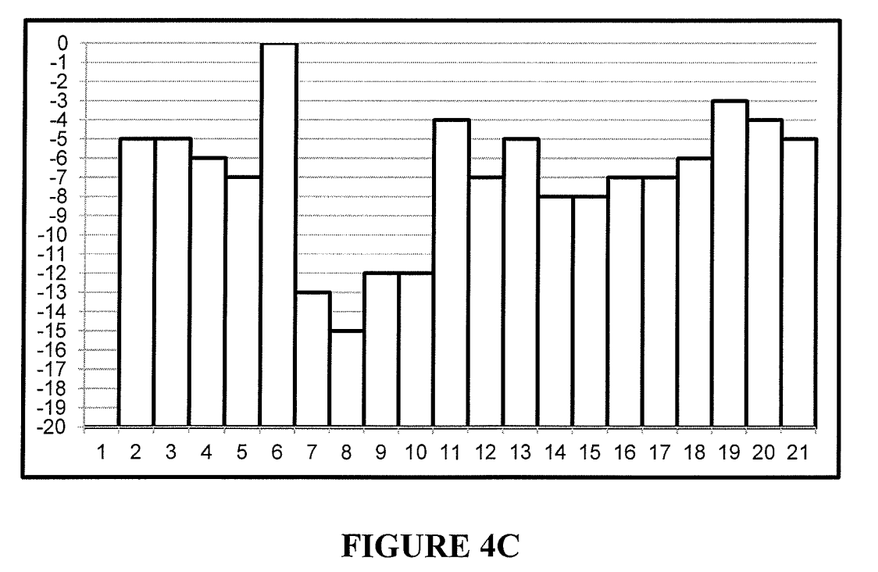

In FIG. 4C, the audio graph of FIG. 4B has been modified by replacing the pressure units of the vertical axis with logarithmic units, i.e. DbFs (decibels full scale) so that the audio levels indicated along the vertical axis of the graph reflect the relative sound volumes perceived by a human listener. While such processing has the effect of making frames containing sound spikes less visually obvious to the editor, it is more useful in flagging volume differences between video clips or within a single clip that warrant correction in the final edited product.

Figure 4D:
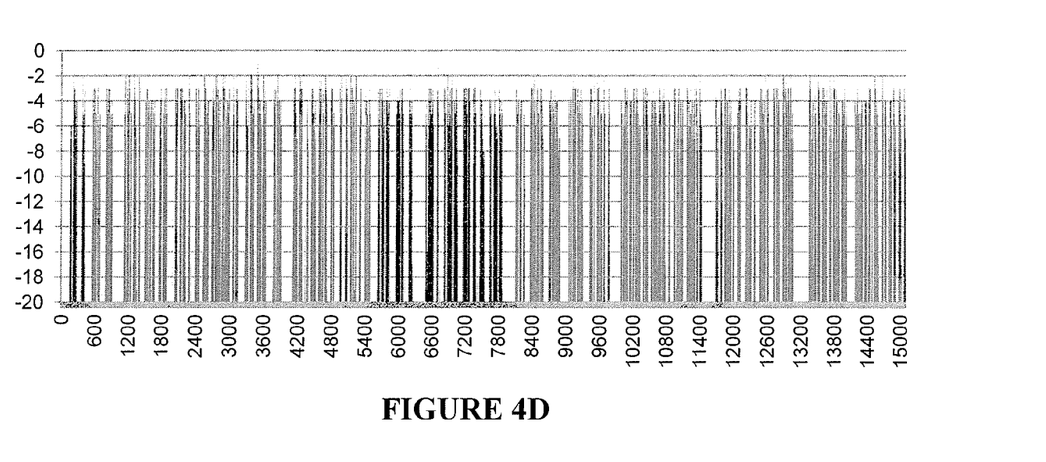
Figure 4E:
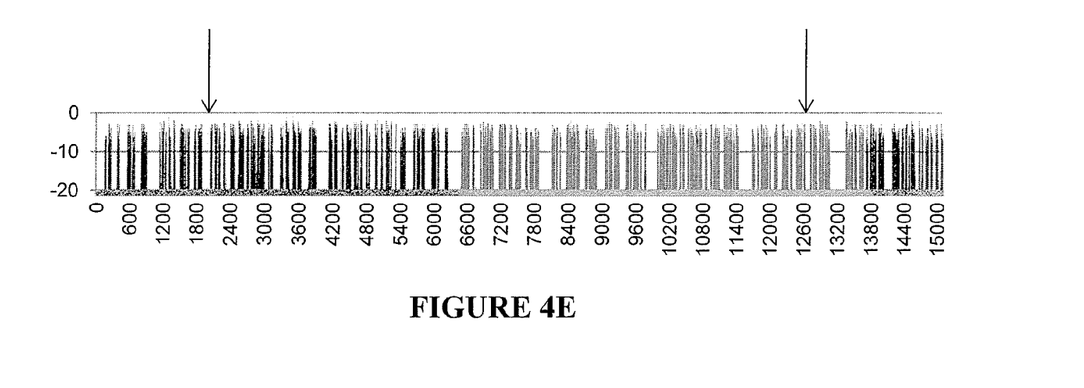
FIG. 4E illustrates how the audio digest server automatically flags each video frame or group of frames having audio levels above a preselected maximum value.

The graphs of FIGS. 3 and 4A-4C illustrate only a very short portion of an audio graph so that the effect of each step in the processing of the raw sound data may be more easily perceived. The graph of FIG. 4D is more representative of an actual audio summary graph that an editor would see when creating an EDL, as each of these graphs covers 15,000 video frames covering about 8.3 minutes of video. Note that even though the density of audio sample points has been reduced to the minimum number necessary to perceive and correct spurious sound spikes (i.e. one sample point per frame) that the density of sample points is too high to allow the easy perception of the sound spikes occurring at frames 2000 and 13600.

To make these two sound spikes easily visible, the audio digest server 21 is programmed to "flag" every video frame or group of frames having an audio level that is higher than a preselected amplitude. In the example illustrated in FIG. 4E such flagging is accomplished by marking every such video frame with an arrow, although any one of a number of visual flags or marks can be used.

Figure 5A:
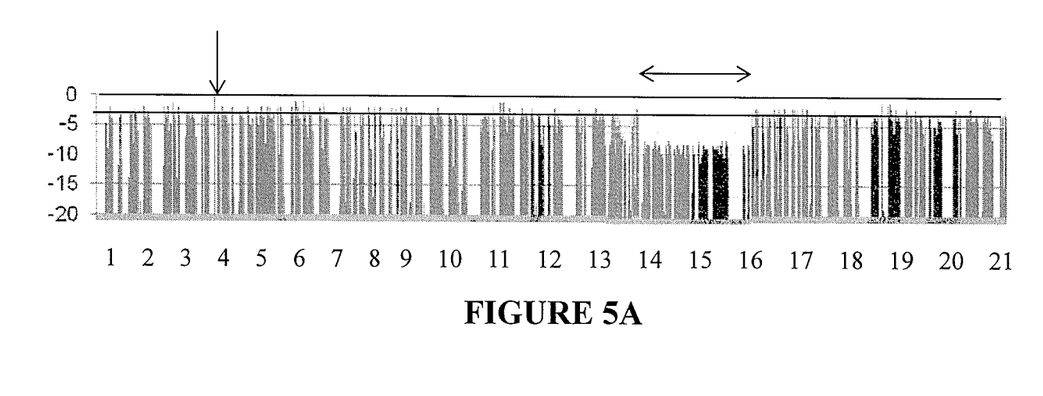
FIGS. 5A and 5B illustrate the operation of the browser-based audio level controls that an editor can use to uniformly raise or lower the volume of a particular segment of the audio graph.
Figure 5B:
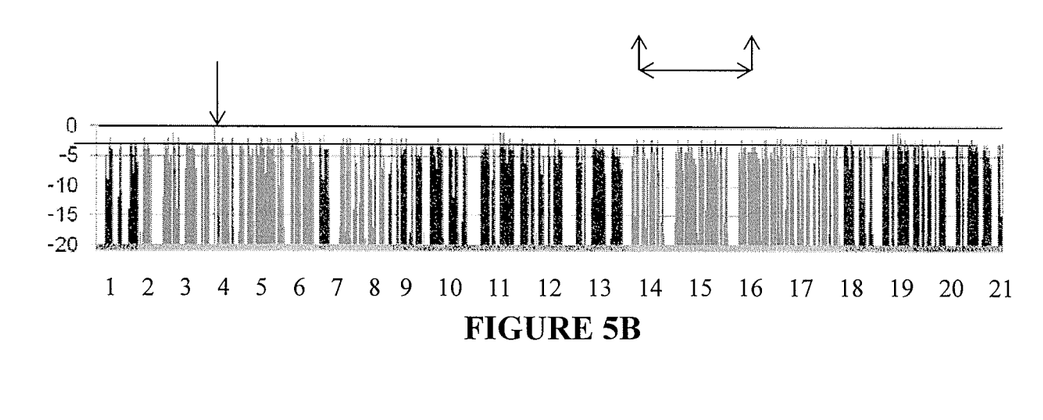

FIGS. 5A and 5B illustrate the operation of the browser-based audio level controls that an editor can use to uniformly raise or lower the sound volume of a particular segment of the audio graph. FIG. 5A illustrates a case wherein the volume of a particular video clip between minutes 16 and 18 has a significantly lower volume than the video clips on either side of it. If uncorrected, abrupt volume changes would occur to the viewer at the beginning and end of this video clip. The browser-based volume controls of the system allow the editor to uniformly raise the volume of the low-volume segment by first swiping his mouse horizontally over the low-volume clip while simultaneously holding down the right-click button to draw a horizontal double-headed arrow over the segment. Next, the editor pulls up the double headed arrow on either side by two vertical click and drag operations, as is indicated by the short vertical arrows. As is illustrated in FIG. 5B, this operation raises the double-headed arrow and at the same time adjusts the volume levels of the video clip below the arrow upwardly to where they match the volume levels of video clips on either side.

Figure 6A:
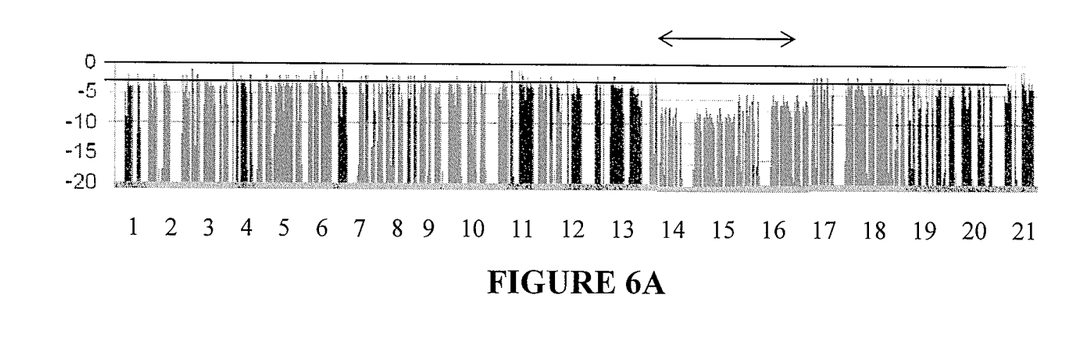
FIGS. 6A and 6B illustrate how the operation of the browser-based audio level controls can raise or lower the volume of a particular segment of the audio graph in a ramp-like fashion.
Figure 6B:
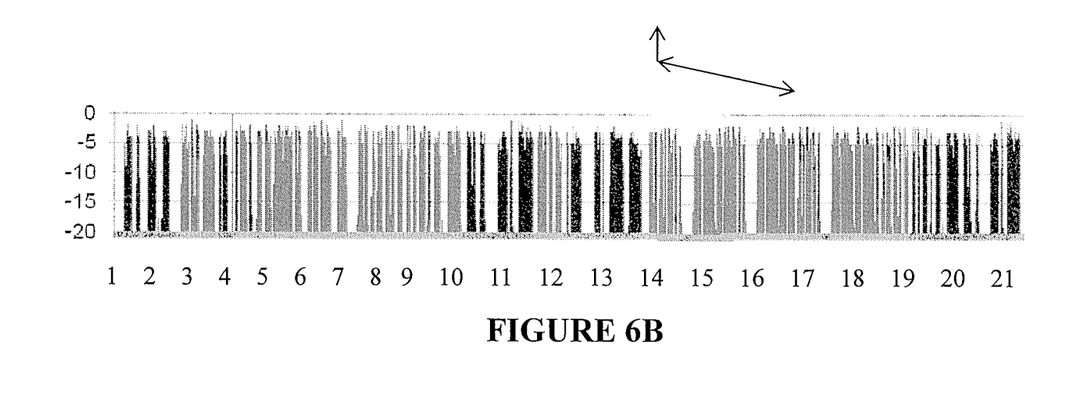

FIGS. 6A and 6B illustrate how the operation of the browser-based audio level controls can raise or lower the volume of a particular segment of the audio graph in a ramp-like fashion. FIG. 6A illustrates a case wherein the volume of a particular video segment between minutes 14 and 16 has a significantly lower volume than the preceding segment at its beginning but increases in volume near its end to a level approximately the same as the successive segment. In such a case, the editor again swipes his mouse over the segment while simultaneously holding down the right-click button to draw a horizontal double-headed arrow over the segment. But instead of clicking and vertically dragging the double-headed arrow on both ends (as was the case in FIGS. 5A and 5B) the editor clicks and vertically drags the double-headed arrow upwardly on only one end as indicated in FIG. 6B. Such an operation achieves a uniform volume level between the video segment between minutes 14 and 16 and the surrounding video segments.

Figure 7:
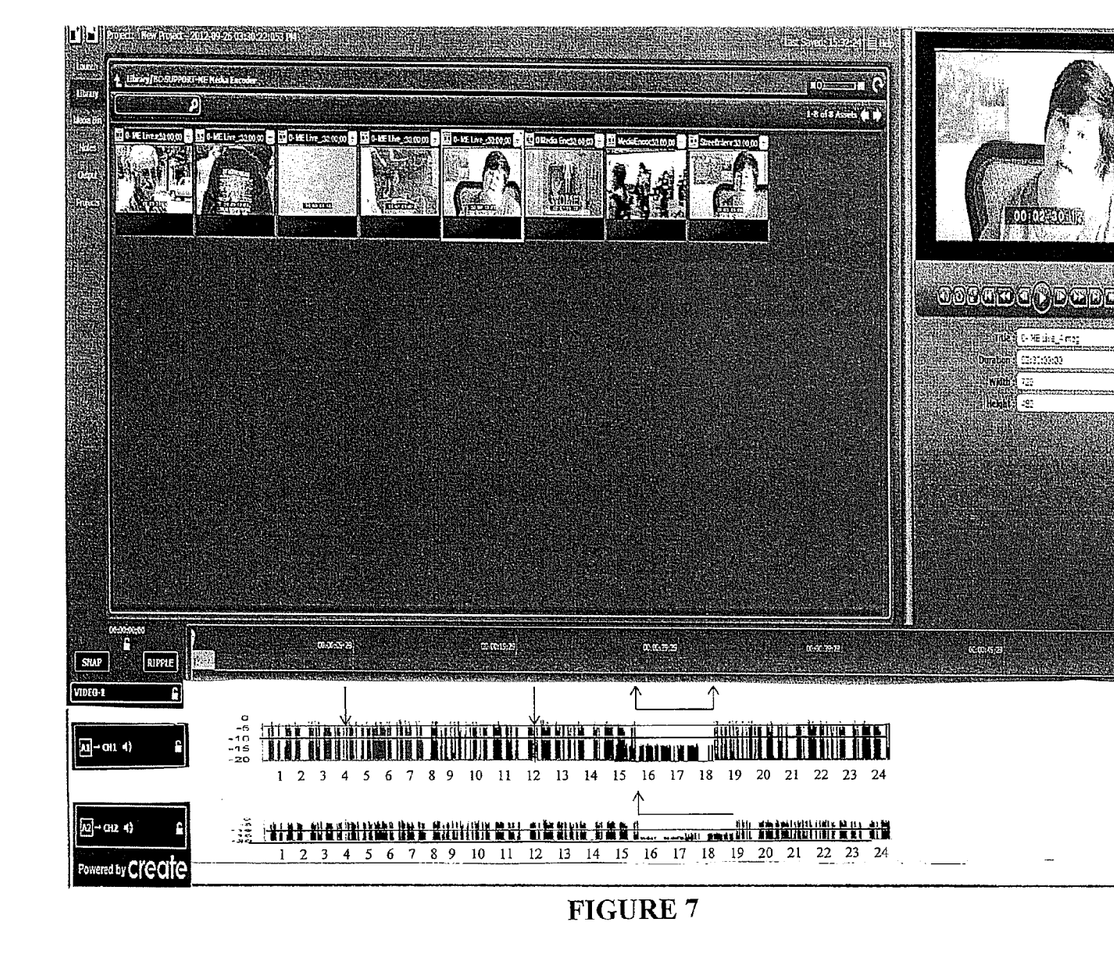
FIG. 7 is a screen shot of the editing station of the NLE system showing how the editing station simultaneously displays the audio graphs of several serially connected video clips, and provides browser-implemented controls that allow an editor to eliminate abrupt volume changes at the transition points between different video clips, raise or lower the sound level of all or a portion of the audio graphs of different clips to achieve the same sound volume throughout the edited product, and to zoom into the frames of video clips having sound spikes.

FIG. 7 is a screen shot of the browser screen 16 of the editing station 12 of an NLE system incorporating the audio level controls of the invention. The screen 16 of the editing station 12 simultaneously displays the thumbnails of the proxies of the video clips ingested into a story directory. In this example of the invention, the editor has double-clicked the thumbnail of the fifth video segment from the left, which is playing on the small screen located on the upper right corner. In this example, the audio level control system is simultaneously displaying the audio graphs of two sound channels of several serially-connected video clips on the screen of the browser, although the system could display the audio graphs of as many sound channels are present in the proxy file. The editor may use the standard web browser controls to adjust the volume of any particular clip or segment of either of the two audio graphs in the manner previously described.

Figure 8:
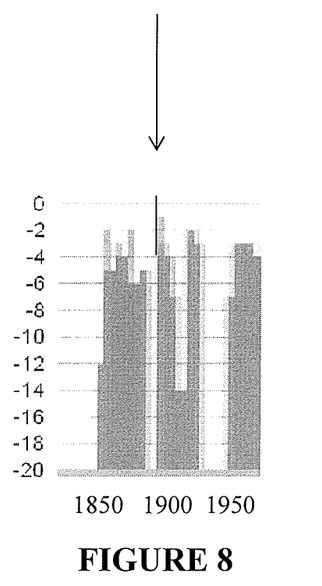
FIG. 8 illustrates how an editor can use the zoom control of the audio controls to selectively zoom into the video frames immediately surrounding a sound spike in order to determine whether the spike is spurious and should be edited out.

FIGS. 7 and 8 in combination illustrate how the browser-based audio level controls may allow an editor to "zoom" into sound spikes in the audio graphs to determine whether or not the volume associated with a sound spike needs to be lowered or left in place. The vertical arrow in FIGS. 5A and 5B indicate the location of the sound spike located at about minute 4 in the audio graph. To zoom into this region of the sound track, the editor merely double clicks the vertical arrow. Once this is done, only the audio graph of the 150 video frames in front of and in back of the frame with the sound spike is displayed on the screen 16 of the editing station, as shown in FIG. 8. A the same time, the system 1 automatically plays the 150 video frames in front of and in back of the spike on the small screen located in the upper right-hand corner of FIG. 7. The playback of the 10 seconds of video containing the spike is usually enough time for the editor to determine if the spike represents a spurious sound (such as a dropped microphone) which should be edited out of the final product, or a legitimate sound (such as a gunshot in a military battle) which should be left in. If a ten-second window of surrounding video is not enough time for the editor to put the sound spike in sufficient to make an editing decision, the editor may enlarge the playback window surrounding the spike.

While the invention has been described in detail with particular reference to certain preferred embodiments thereof, it will be understood that variations and modifications can be effected within the spirit and scope of the invention, which is limited only by the appended claims and equivalents thereof.

The invention claimed is:

1. A non-linear, proxy-based editing system, comprising:
   a proxy file generator that generates a lower resolution proxy file of source video files containing both video and audio information;
   an audio summary file generator that generates an audio summary file from the audio information in the proxy file by providing a single audio level for each video frame of the proxy file;
   an icon generator that generates an image representative of each proxy file;
   a web user interface having a visual display for displaying the representative icons associated with selected proxy files and their associated audio level summary files, and
   a digital controller connected to the proxy file generator, the audio summary file generator, the icon generator, and the web user interface,
   wherein, the digital controller simultaneously displays on the visual display a graph of the audio summary files of at least two source video files that includes a time axis in units of video frames, and an amplitude axis in units of audio level, and further displays both the audio summary files and the representative icons associated with the at least two source video files in serial chronological order, and further provides the web user interface with audio level controls for adjusting the audio level of some or all of the graph,
   wherein the digital controller displays the audio level in the graph on a logarithmic scale in decibels, and provides the web user interface with an attenuation control that allows a user to simultaneously attenuate the audio level of every video frame that is higher than a preselected maximum audio level to a preselected audio level.

2. The non-linear editing system of claim 1, wherein the audio summary file generator determines the single audio level per video frame by selecting the highest audio level within the frame that lasts a sufficiently long time to be audibly perceived.

3. The non-linear editing system of claim 1, wherein the audio summary file generator determines the single audio level per video frame by selecting the highest audio level within the frame that lasts at least about 5 milliseconds.

4. The non-linear editing system of claim 1, wherein the digital controller further provides a visual indication on the graph of the location of every frame or group of frames having an associated audio level that is higher than a preselected maximum audio level.

5. The non-linear editing system of claim 1, wherein the digital controller provides the web user interface with a zoom control that allows a user to selectively zoom into and play a portion of the proxy file that includes the frame or group of frames designated by a visual indication in order to make an editing decision.

6. The non-linear editing system of claim 1, wherein when two or more proxy files are assembled into a final edited product, the digital controller simultaneously and serially displays on the visual display the audio summary file graphs of the assembled proxy files to allow a user to selectively raise or lower the audio levels at the transition point between the two proxy files to avoid abrupt changes in volume.

7. The non-linear editing system of claim 1, wherein the audio summary file generator includes an audio summary file server which exports the audio information in the source video file to a processor outside of the non-linear editing system along with processing instructions for converting the audio information into an audio summary file, and which imports the audio summary file generated by the outside processor.

8. A non-linear, proxy-based editing system, comprising:
an ingestion station;
a source file repository that stores media source files formed from a plurality of source video frames copied from memory cards read by the ingestion station;
a proxy file generator that generates a lower resolution proxy file of source video files containing both video and audio information by generating a lower resolution video frame for each source video frame;
an icon generator that generates an icon associated with each proxy file that includes one of the lower resolution video frames of the proxy file;
an audio summary file generator that generates an audio summary file from the audio information in the source video files that provides a single audio level for each video frame of the proxy file;
a web user interface having a visual display for displaying a selected one of the proxy files and its associated icon and audio summary file, and
a digital controller connected to the proxy file generator, the icon generator, the audio summary file generator, and the web user interface,
wherein, the digital controller simultaneously displays on the visual display the icons associated with at least two of the proxy files, and a graph of the audio summary file of the two proxy files that includes a time axis in units of video frames, and an amplitude axis in units of audio level, and provides the web user interface with audio level controls for adjusting the audio level of some or all of the graph, and
wherein both the icons and the graphs of the audio summary files of the proxy files are simultaneously displayed in serial chronological order, and
wherein the digital controller displays the audio level in the graph on a logarithmic scale in decibels, and provides the web user interface with an attenuation control that allows a user to simultaneously attenuate the audio level of every video frame that is higher than a preselected maximum audio level to a preselected audio level.

9. The non-linear editing system of claim 8, wherein the audio summary file generator determines the single audio level per video frame by selecting the highest audio level within the frame that lasts a sufficiently long time to be audibly perceived.

10. The non-linear editing system of claim 8, wherein the audio summary file generator determines the single audio level per video frame by selecting the highest audio level within the frame that lasts at least about 5 milliseconds.

* * * * *